US007318039B2

United States Patent
Yokota et al.

(10) Patent No.: US 7,318,039 B2
(45) Date of Patent: Jan. 8, 2008

(54) PROJECT RISK MANAGEMENT SYSTEM UTILIZING PROBABILITY DISTRIBUTIONS

(75) Inventors: Takeshi Yokota, Hitachi (JP); Hisanori Nonaka, Tokai (JP); Kenji Araki, Mito (JP); Youichi Nishikawa, Tokyo (JP); Makoto Kudoh, Kashiwa (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1229 days.

(21) Appl. No.: 10/246,690

(22) Filed: Sep. 19, 2002

(65) Prior Publication Data

US 2003/0225605 A1 Dec. 4, 2003

(30) Foreign Application Priority Data

May 29, 2002 (JP) .............................. 2002-155945

(51) Int. Cl.
*G06F 9/44* (2006.01)
(52) U.S. Cl. ........................................................ 705/7
(58) Field of Classification Search ..................... 705/7
See application file for complete search history.

(56) References Cited

U.S. PATENT DOCUMENTS

| | | | |
|---|---|---|---|
| 5,623,404 A * | 4/1997 | Collins et al. .................. 705/9 |
| 5,918,219 A * | 6/1999 | Isherwood .................... 705/37 |
| 6,237,915 B1 * | 5/2001 | Ledet et al. ................. 273/236 |
| 6,397,202 B1 * | 5/2002 | Higgins et al. ............... 706/47 |
| 6,591,232 B1 * | 7/2003 | Kassapoglou .................. 703/2 |
| 6,675,127 B2 * | 1/2004 | LaBlanc et al. ............ 702/181 |
| 6,889,196 B1 * | 5/2005 | Clark .............................. 705/9 |
| 6,895,383 B2 * | 5/2005 | Heinrich ......................... 705/7 |
| 7,113,914 B1 * | 9/2006 | Spielmann et al. ............ 704/7 |
| 2002/0138318 A1 * | 9/2002 | Ellis et al. ...................... 705/7 |
| 2002/0194040 A1 * | 12/2002 | Kornfein et al. ............... 705/7 |
| 2002/0198750 A1 * | 12/2002 | Innes et al. ..................... 705/7 |
| 2003/0023470 A1 * | 1/2003 | Labbi ............................. 705/7 |

(Continued)

FOREIGN PATENT DOCUMENTS

JP A-10-240804 9/1998

(Continued)

OTHER PUBLICATIONS

Ranasinghe, Malik, Quantification and management of uncertainty in activity duration networks Construction Management and Economics, vol. 12, No. 1, Jan. 1994, Abstract.*

(Continued)

*Primary Examiner*—Tariq R. Hafiz
*Assistant Examiner*—Scott L. Jarrett
(74) *Attorney, Agent, or Firm*—Mattingly, Stanger, Malur & Brundidge, P.C.

(57) ABSTRACT

When the process plan made for execution is corrected based on the process correction condition, the variation amount in each of processes based on the process correction condition is calculated as the probability distribution using the probability distribution data generated by obtaining the probability distribution from the variation-amount prediction value of each of the processes. Thereby, the influence degree on other processes when the process is corrected can be estimated not simply as the propagation of the variation fixed value but so as to be more suited to the actual circumstances in accordance with the attribute information and the past variation patterns of the process.

6 Claims, 15 Drawing Sheets

U.S. PATENT DOCUMENTS

2003/0187766 A1* 10/2003 Akashi .................. 705/35
2004/0073505 A1* 4/2004 Wright .................. 705/36

FOREIGN PATENT DOCUMENTS

JP         2000200303 A  *  7/2000

OTHER PUBLICATIONS

Finley, Eric D. et al., Project Scheduling Risk Assessment Using Monte Carlo Methods Cost Engineering, vol. 36, No. 10, 1994, pp. 24-28.*

Ock, Jong H., Activity duration quantification under uncertainty: Fuzzy set theory application Cost Engineering, vol. 38, No. 1, Jan. 1996.*

Yang, Kum-Khiong, Effects of erroneous estimation of activity durations scheduleing and dispatching a single project Decision Sciences, vol. 27, No. 2, Spring 1996, pp. 255-290.*

Hernandex, Toms, Software Solutions Building Design & Construction, vol. 40, No. 11, Nov. 1999, pp. 38-40.*

Royer, Paul, Risk management: The undiscovered dimension of project management Project Management Journal, vol. 31, No. 1, Mar. 2000.*

Mills, Anthony, A systematic approach to risk management for construction Structural Survey, vol. 19, No. 5, 2001, pp. 245-252.*

Prasanta, K. Dey et al., Project Time Risk Analysis Through Simulation Cost Engineering, vol. 43, No. 7, Jul. 2001, pp. 24-32.*

Isidore, Leroy J. et al., Integrated probabalistic schedules and estimates from project simulated data Construction Management and Economics, vol. 19, 2001, pp. 417-426.*

Palisade.com Web Pages Palisade Inc, 2000, Retreived from Archive.org Sep. 23, 2005.*

Scramsoftware.com Web Pages SCRAM Software, Apr. 2000, Retrieved from Archive.org Apr. 5, 2006.*

Pyron, Tim, Team Yourself Microsoft Project 98 in 24 Hours Sames Publishing, May 7, 1998, ISBN: 0-672-31258-1.*

Marchman, David A., Construction Scheduling with Primavera Project Planner Delmar Publishers, Aug. 14, 1997, ISBN: 0827370865.*

Rose, Aaron, The Role of Probablility in Scheduling Transactions of the American Association of Cost Engineers, 1981, Abstract.*

Dawood, Nashwan, Estimating project and activity duration: a risk management approach using network analysis Construction Management and Economics, vol. 16, 1998, pp. 41-48.*

Basu, Abhi, Practical Risk Analysis in Scheduling AACE International Transactions, 1998.*

Dawson, R.J. et al., Practical Proposals for Managing Uncertainty and Risk in Project Planning International Journal of Project Management, vol. 16, No. 5, Oct. 1998, Abstract.*

Hammond, Chris, @Risk arms Excel with Risk Analysis InfoWorld, vol. 22, No. 12, Mar. 20, 2000.*

Isidore, Leroy et al., Integrated Range Estimating an Stochastic Scheduling Cost Engineering, vol. 43, No. 2, Feb. 2001.*

* cited by examiner

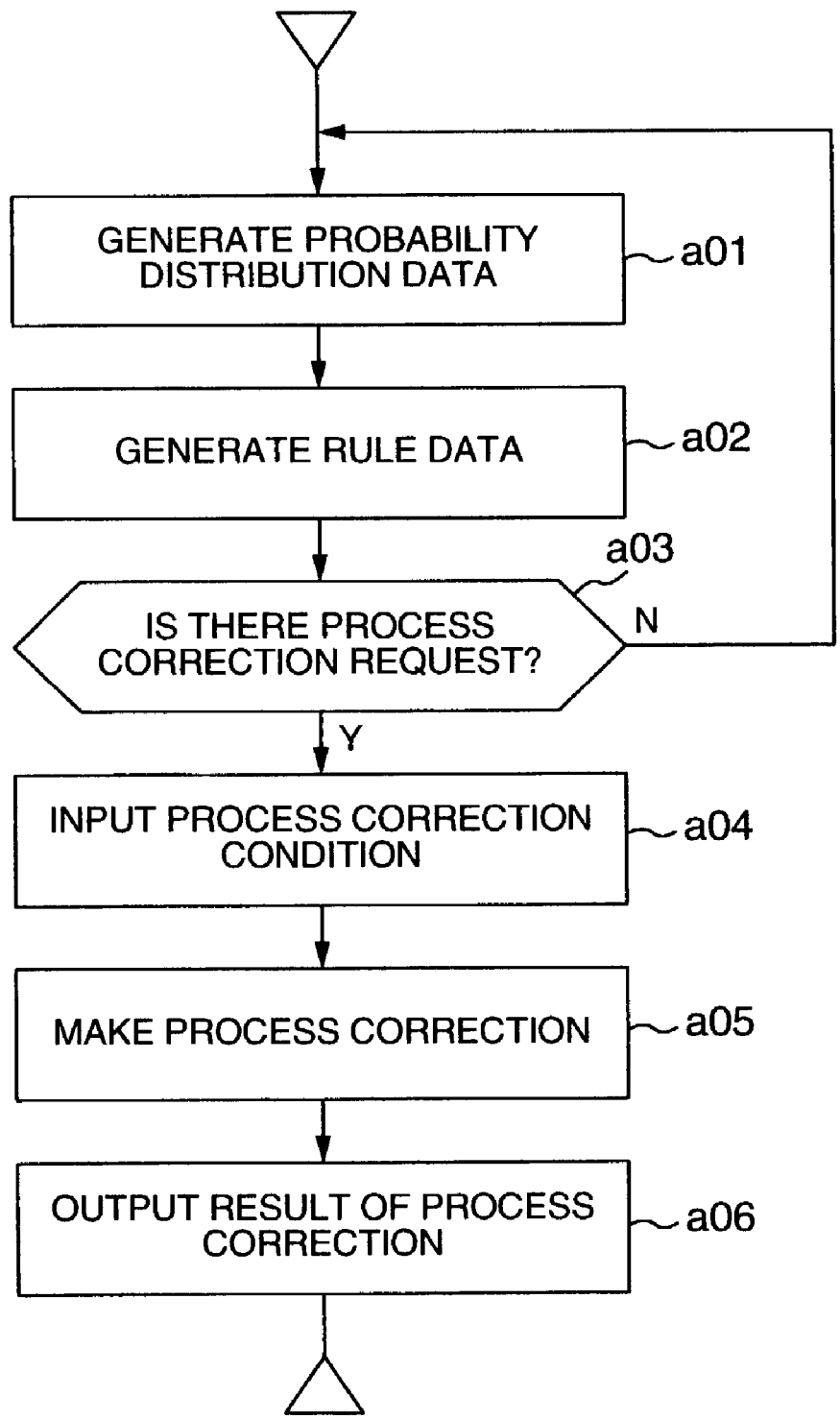

FIG. 4

| | |
|---|---|
| 901 | PROCESS NAME | BOILER TUBE INSTALLATION |
| 902 | WORK TYPE | INSTALLATION WORK |
| 903 | TYPE OF PARTS TO BE WORKED ON | TUBE |
| 904 | NUMBER OF PARTS TO BE WORKED ON | 5 SPOOLS |
| 905 | TOTAL WEIGHT OF PARTS TO BE WORKED ON | 10 (t) |
| 906 | OCCUPATIONAL CATEGORY OF WORKERS | WORKERS ON SCAFFOLDING |
| 907 | NAME OF ENGINEERING WORK COMPANY | ENGINEERING WORK FIRM "A" |
| 908 | PLANNED NUMBER OF MAN-HOUR | 50 (MAN · DAY) |
| 909 | ACTUAL NUMBER OF MAN-HOUR | 55 (MAN · DAY) |
| 910 | PLANNED CONSTRUCTION PERIOD | 12 (DAYS) |
| 911 | ACTUAL CONSTRUCTION PERIOD | 13 (DAYS) |
| 912 | WEATHER DURING WORK | FINE (70%), CLOUDY (30%) |
| 913 | WORK AREA | OUTDOORS |
| 914 | SCAFFOLDING | PRESENT |
| 915 | USE OF MATERIAL-HANDLING DEVICE | YES |
| 916 | NUMBER OF WORKERS | 15 (PERSONS) |

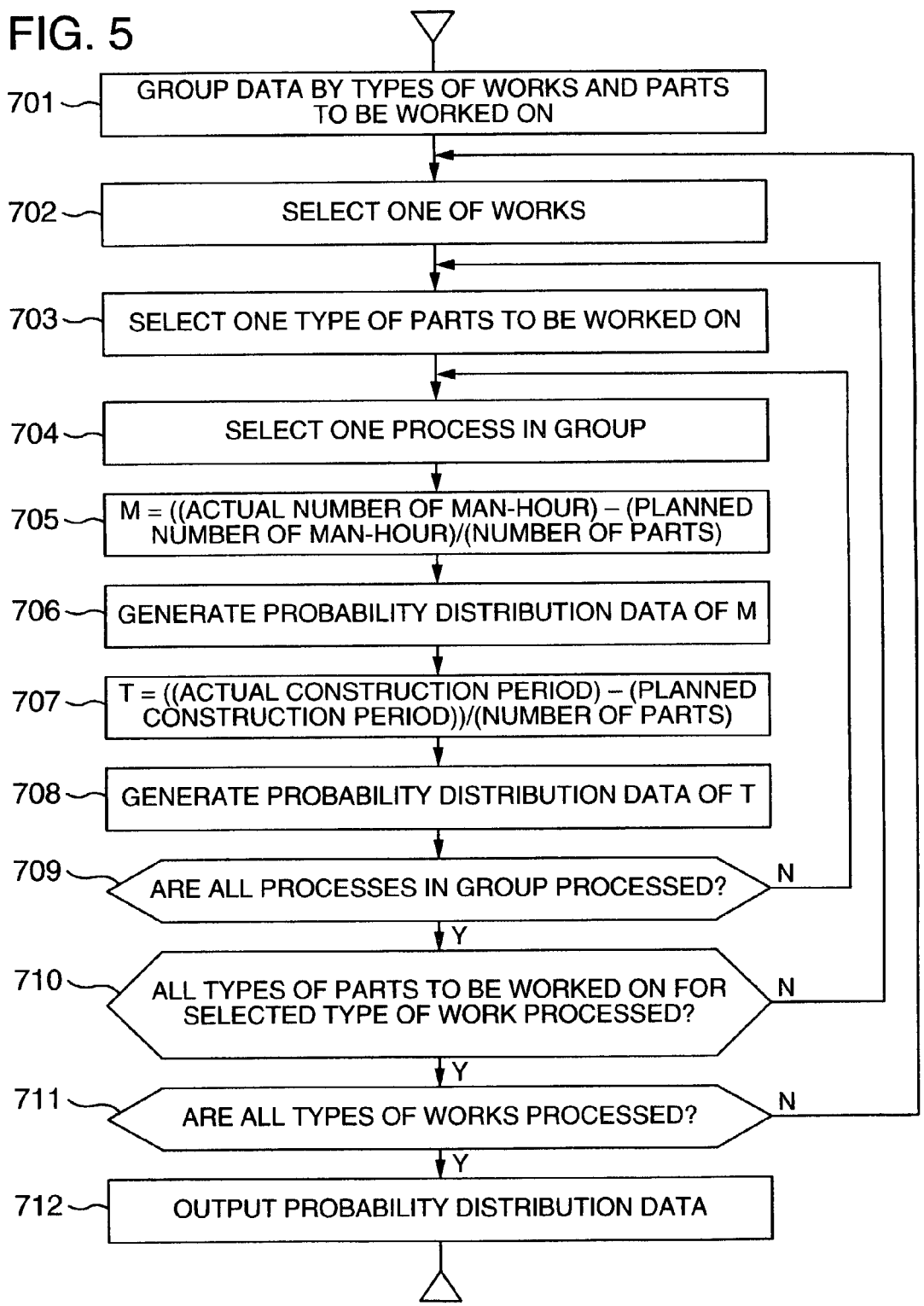

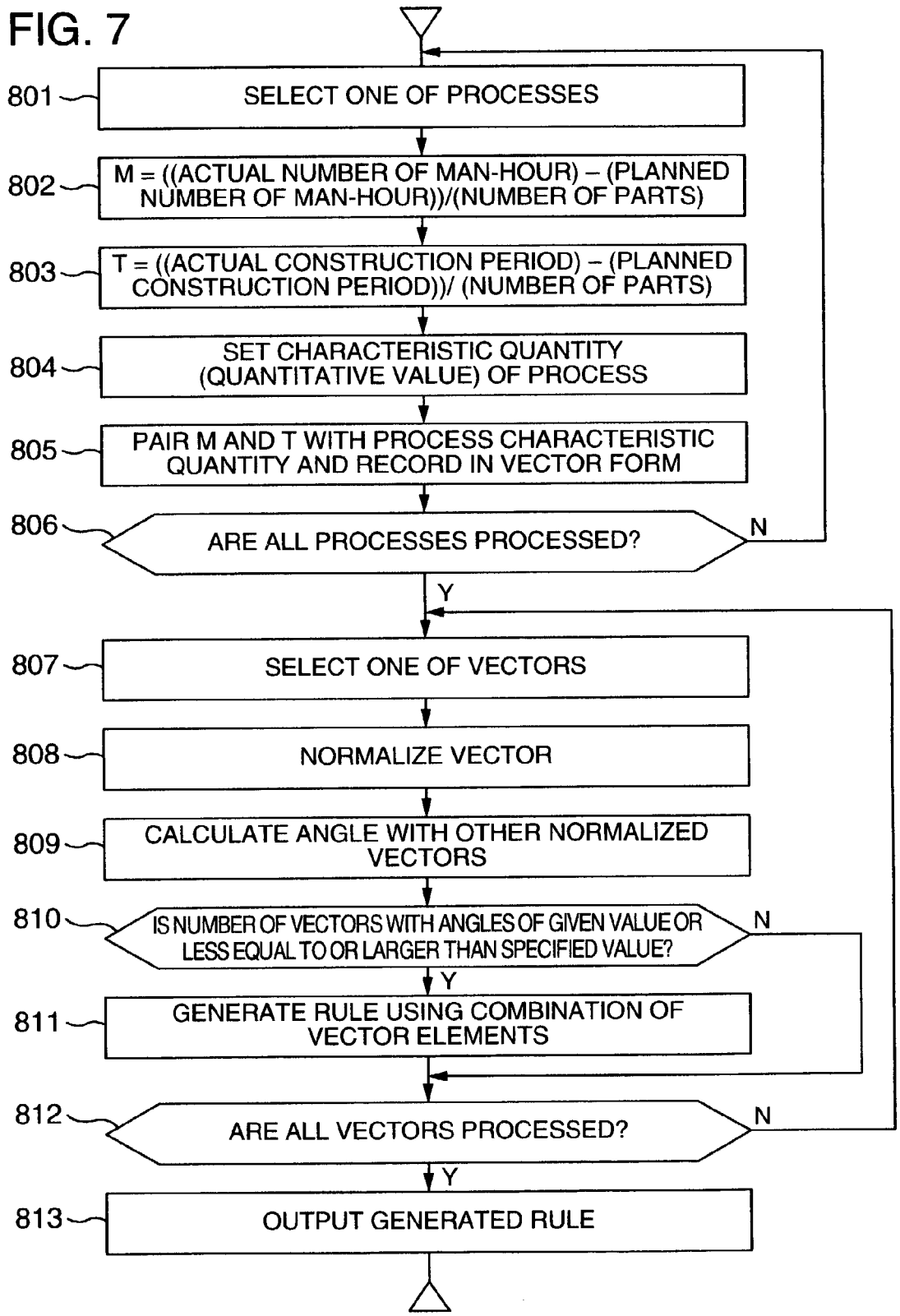

FIG. 8

| | CONDITION DIVISION | PARAMETER | FINE DAY RATE | SCAFFOLDING |
|---|---|---|---|---|
| 601 | CONDITION DIVISION | PARAMETER | FINE DAY RATE | SCAFFOLDING |
| 602 | | CONDITION | > | = |
| 603 | | THRESHOLD | 70% | 1 (PRESENT) |
| 604 | | RELATION WITH OTHER CONDITION | AND | AND |
| 605 | RULE | PARAMETER | CONSTRUCTION PERIOD | |
| 606 | | INFLUENCE DEGREE | +2 (DAYS) | |

FIG. 10

| | | | |
|---|---|---|---|
| 201 | PROCESS CODE | | 406 |
| 202 | TIME CONSTRAINT | START TIME RANGE | 2001/8/1~2001/10/31 |
| 203 | | FINISH TIME RANGE | 2001/9/20~2001/12/1 |
| 204 | SEQUENCE CONSTRAINT | PRECEDING PROCESS CODE | 101,102,205 |
| 205 | | SUBSEQUENT PROCESS CODE | 412,501 |

FIG. 11

| | | |
|---|---|---|
| 501 | PROCESS NAME | BOILER TUBE INSTALLATION |
| 502 | PROCESS CODE | 401 |
| 503 | WORK TYPE | INSTALLATION WORK |
| 504 | TYPE OF PARTS TO BE WORKED ON | TUBE |
| 505 | NUMBER OF PARTS TO BE HANDLED WORKED ON | 5 SPOOLS |
| 506 | TOTAL WEIGHT OF PARTS TO BE WORKED ON | 10 (t) |
| 507 | OCCUPATIONAL CATEGORY OF WORKERS | WORKERS ON SCAFFOLDING |
| 508 | NAME OF ENGINEERING WORK COMPANY | ENGINEERING WORK FIRM "A" |
| 509 | PLANNED NUMBER OF MAN-HOUR | 50 (MAN · DAY) |
| 510 | PLANNED CONSTRUCTION PERIOD | 12 (DAYS) |
| 511 | PLANNED START DATE | 2001/8/5 |
| 512 | PLANNED FINISH DATE | 2001/8/18 |
| 513 | WORK AREA | OUTDOORS |
| 514 | SCAFFOLDING | NECESSARY |
| 515 | USE OF MATERIAL-HANDLING DEVICE | UNNECESSARY |
| 516 | NUMBER OF WORKERS | 15 (PERSONS) |
| 517 | FREQUENCY DISTRIBUTION DATA ON VARIATION-RANGE PREDICTION VALUES FOR PROCESS START DATE | |
| 518 | FREQUENCY DISTRIBUTION DATA ON VARIATION-RANGE PREDICTION VALUES FOR PROCESS FINISH DATE | |
| 519 | FREQUENCY DISTRIBUTION DATA ON VARIATION-AMOUNT PREDICTION VALUES FOR CONSTRUCTION PERIOD | |
| 520 | FREQUENCY DISTRIBUTION DATA ON VARIATION-AMOUNT PREDICTION VALUES FOR NUMBER OF MAN-HOUR | | though constant by the period required for completion of the process).
PROJECT RISK MANAGEMENT SYSTEM UTILIZING PROBABILITY DISTRIBUTIONS

BACKGROUND OF THE INVENTION

The present invention relates to a project risk management system for evaluating how much influence correction of a process plan exerts on an entire project while project management is performed.

For performing a project, when a process plan from start to finish is worked out, each of the worked-out processes has its own time constraint (i.e., a constraint condition determined by a period required for completion of the process). Each of the worked-out processes is also has a sequence constraint which is a constraint condition determined by an execution sequence relation with other processes. In the process plan for the project, during execution of the process plan, a construction period might be corrected or modified. Thus, in executing the process plan as described above, if the construction-period correction/modification occurs, how much influence it exerts on other processes is evaluated.

When this construction-period correction/modification of a certain process occurs and the influence of the correction/modification on other processes is evaluated, conventionally, a method is often employed in which it is calculated on the basis of the time constraint and the sequence constraint in each of the processes how the construction-period correction/modification amount in the certain process propagates to processes, which are subjected to the sequence constraint relation with the certain process, within the range of the time constraint. As such a conventional specific approach to managing the correction/modification of the process plan, there is provided JP-A-10-240804 and so forth, for example.

SUMMARY OF THE INVENTION

The conventional method of calculating how the construction-period correction/modification amount propagates within the range of the time constraint defines the propagation of the correction/modification amount of the process plan as a fixed value. That is, when execution of a process "A" is ten days behind an initial process plan, it is calculated that a process "B" subjected to the sequence constraint relation with the process "A" (having the execution sequence relation with other processes) is also delayed ten days.

However, even if the process "B" is subjected to the sequence constraint relation with the process "A" and if the execution of the process "A" is ten days behind the initial process plan, countermeasures against the delay can be sometimes made, in actuality. In such a case, the propagation of the delay amount in the process becomes variable. Accordingly, even if the execution of the process "A" is delayed for ten days, it often happens that the propagation amount of the correction/modification to the other processes does not always become ten days due to the specific contents of the sequence constraint of the process "B" imposed on the process "A" or other individual factors.

For this reason, when the conventional evaluation of the influence degree of the correction/modification in the process plan is performed, in order to obtain the more accurate propagation amount to the other processes, there is a problem that it is necessary to determine the influence degree in view of uncertain factors such as the specific contents of the sequence constraint and other individual factors.

An object of the present invention is to provide a project risk management system and a project risk management apparatus which can perform an evaluation of an influence degree which is more suited to actual circumstances, upon evaluation of the influence degree of contents of correction/modification of a process plan on other process plans.

In order to achieve the object described above, in a project risk management system of the present invention, an influence value of a correction/modification amount is calculated using information in which an influence rate of correction/modification amount of a process is defined as a probability distribution, and information in which an individual process correction method dependent on various variation factors is defined as rule information, in addition to information on a constraint condition which is conventionally used.

Further, means for automatically generating the information on the probability distribution and the rule information using past instance data on project management is employed.

Other objects, features and advantages of the invention will become apparent from the following description of the embodiments of the invention taken in conjunction with the accompanying drawings.

BRIEF DESCRIPTION OF THE DRAWINGS

FIG. 3 is a drawing showing a flowchart for overall processing by a project risk management system based on the configuration of the project risk management system and the project risk management apparatus illustrated in FIG. 2;

FIG. 4 is a drawing showing a data recording format for instance data recorded in an instance database;

FIG. 5 is a drawing showing a flowchart for processing by a probability distribution data generator;

FIG. 7 is a drawing showing a flowchart for processing by a rule data generator illustrated in FIG. 2;

FIG. 8 is a drawing showing a data recording format for a rule database illustrated in FIG. 2;

FIG. 10 is a drawing showing a data recording format for a constraint condition database illustrated in FIGS. 1 and 2;

FIG. 11 is a drawing showing a data recording format for a process plan database illustrated in FIGS. 1 and 2;

DETAILED DESCRIPTION OF THE EMBODIMENTS

An embodiment of a project risk management system and a project risk management apparatus according to the present invention will be described with reference to FIGS. 1-16.

Figure 1:
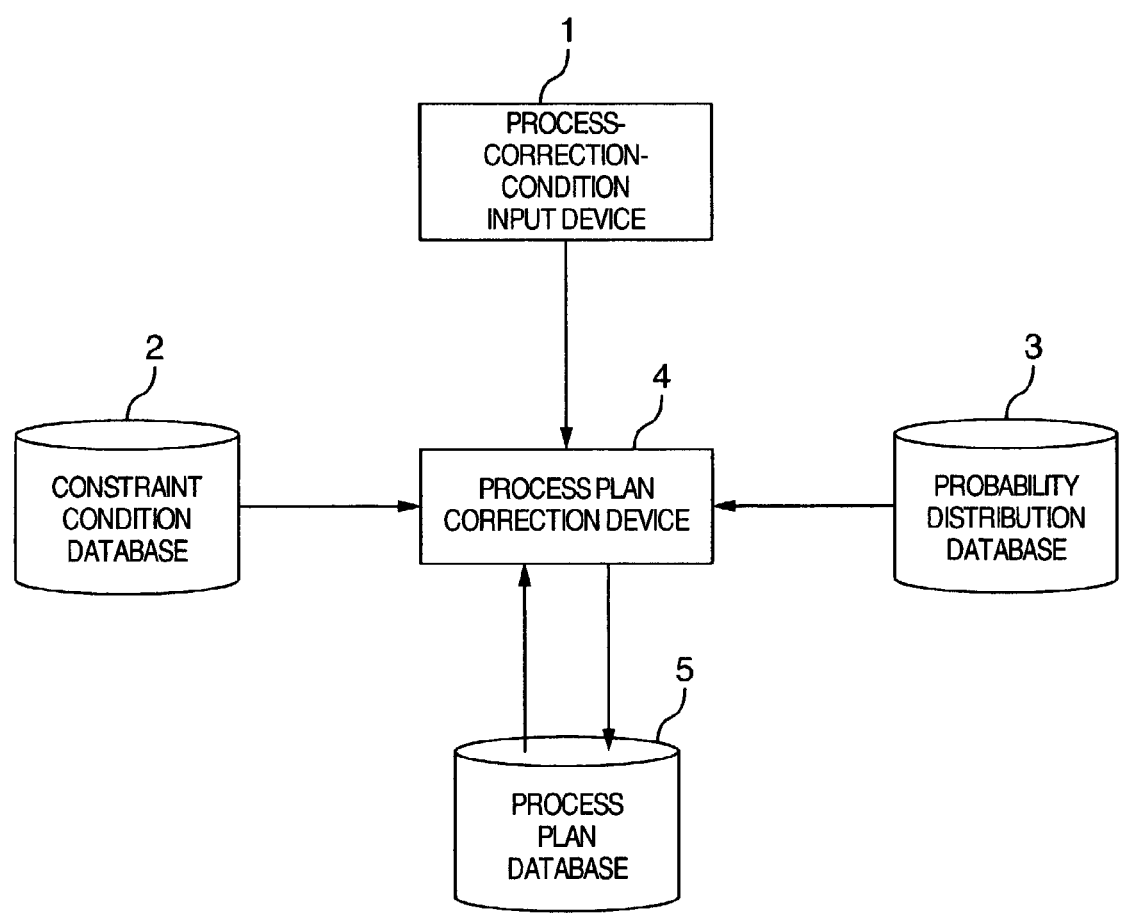
FIG. 1 is a drawing showing a basic configuration of a project risk management system and a project risk management apparatus according to the present invention, which is minimally required.

FIG. 1 shows a basic configuration of the project risk management system and the project risk management apparatus according to the present invention, which is minimally required.

Incidentally, the description is directed to the case where a construction work is used as an example of a project for the project risk management system and the project risk management apparatus according to the present embodiment.

Referring to FIG. 1, the project risk management system and the project risk management apparatus basically include a process-correction-condition input device 1, a constraint condition database 2, a probability distribution database 3, a process plan correction device 4, and a process plan database 5.

For performing correction of a process plan, it is first inputted, using the process-correction-condition input device 1, which process (e.g., a process "A") is to be corrected and how the process should be corrected (e.g., ten days' delay in the process plan). Then, processes (e.g., processes "C" and "D") associated with the corrected process (e.g., the process "A") are extracted using information stored in the constraint condition database 2. At the same time, information indicating to what extent these processes (e.g., the processes "C" and "D") can be varied is also extracted from the constraint condition database 2.

Further, it is extracted, as information on probability distribution, from the probability distribution database 3 how much influence and with how much probability the processes (e.g., the processes "C" and "D") which will be influenced are subjected to according to the correction contents (e.g., ten day's delay in the process plan) of the corrected process (e.g., the process "A") and attribute information (information on the type of a work and the type of parts to be worked on and so forth) of the processes (e.g., the processes "C" and "D") which will be influenced.

Using these information, for process information recorded in the process plan database 5, the process correction device 4 calculates the influence degree on the processes (e.g., the processes "C" and "D") which will be influenced by the process (e.g., the process "A") to which the correction is inputted. Then, the process correction device 4 records the result of the calculation in the process plan database 5 as updated process information.

Figure 2:
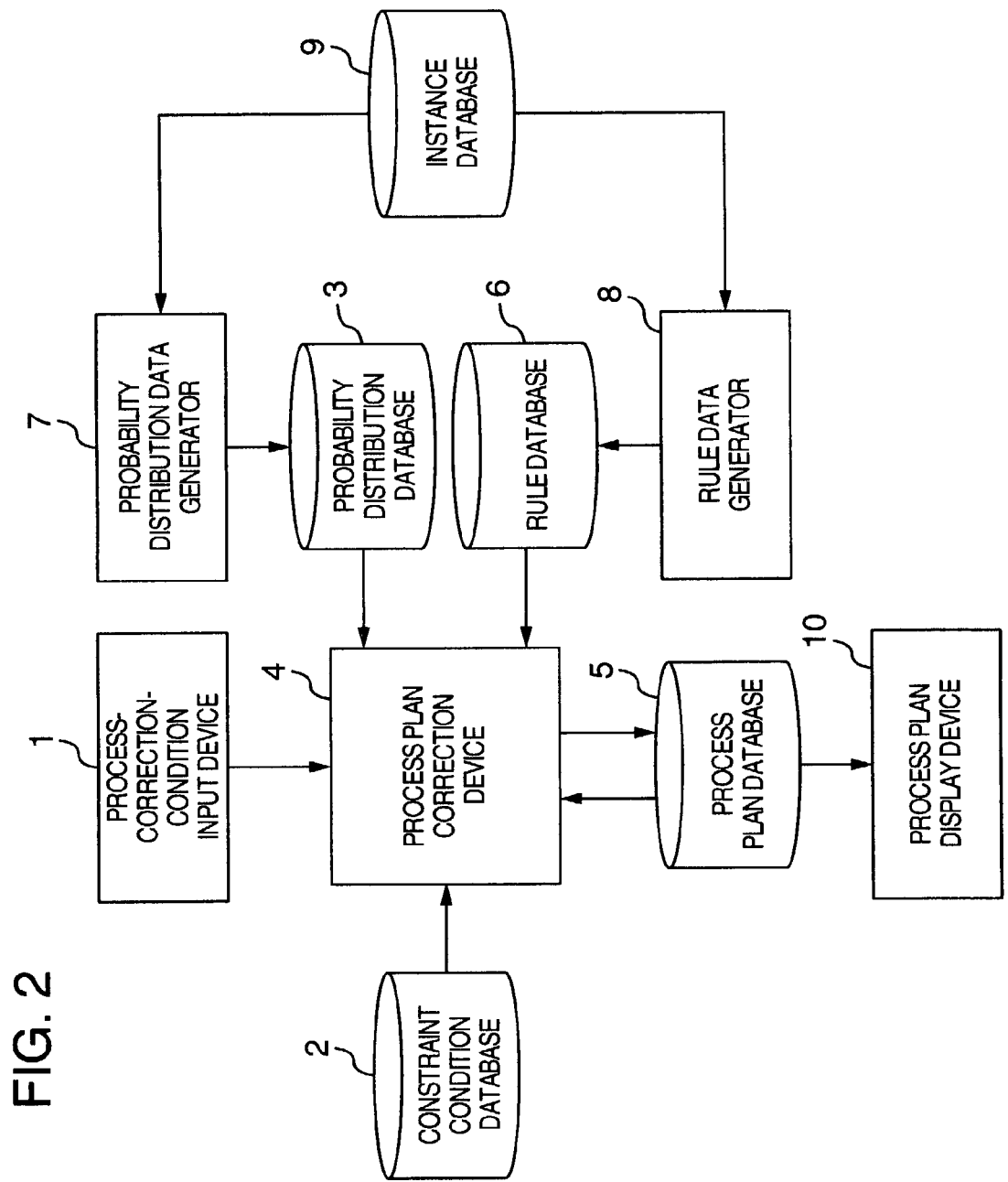
FIG. 2 is a drawing showing a basic configuration of the project risk management system and the project risk management apparatus illustrated in FIG. 1, with system expansion functional units included.

FIG. 2 shows a basic configuration of the project risk management system and the project risk management apparatus illustrated in FIG. 1, with system expanding functions included.

In addition to the configuration of the project risk management system illustrated in FIG. 1, the project risk management system and the project risk management apparatus illustrated in FIG. 2 further includes a rule database 6, a probability distribution data generator 7, a rule data generator 8, an instance database 9 and a process plan display device 10.

In the configuration illustrated in FIG. 2, before correction of the process, using information recorded in the instance database 9 which mainly records attribute information (information on the types of works, the types of parts to be worked on, and so forth) of each of the processes in a past project and information on planned and actual values for construction periods and the number of man-hour, the project risk management system generates information on the probability distribution of process variation amounts in accordance with the attribute information in the probability distribution data generator 7. The project risk management system then records the generated information in the probability distribution database 3. Thereafter, the project risk management system generates a process correction rule in accordance with the attribute information in the rule data generator 8, and then records it in the rule database 6.

For correction of the process plan, information indicating which process (e.g., the process "A") is to be corrected and how the process is to be corrected (e.g., ten days' delay in the process plan) is first inputted using the process-correction-condition input device 1. Then, the processes (e.g., the processes "C" and "D") associated with the corrected process (e.g., the process "A") are extracted using the information stored in the constraint condition database 2. At the same time, the information indicating to what extent these processes (e.g., the processes "C" and "D") can be varied is also extracted from the constraint condition database 2.

Then, it is extracted as, the information on probability distribution, from the probability distribution database 3 how much influence and with how much probability the processes (e.g., the processes "C" and "D") which will be influenced are subjected to according to the correction contents (e.g., ten day's delay in the process plan) of the corrected process (e.g., the process "A") and the attribute information (e.g., information on the type of a work and the type of parts to be worked on) of the processes (e.g., the processes "C" and "D") which will be influenced. Further, the process correction rule corresponding to the attribute information of the process is extracted from the rule database 6.

Using these information, the process correction device 4 calculates the influence degree on the processes (e.g., the processes "C" and "D") which will be influenced by the process (e.g., the process "A") to which the correction is inputted. Then, the process correction device 4 records the calculation result in the process plan database 5 as updated process information. Further, the correction result of the process is displayed by the process plan display device 10.

FIG. 3 shows a flowchart for daily process information management as overall processing by a project risk management system based on the configuration of the project risk management system and the project risk management apparatus illustrated in FIG. 2.

First, in step a01, when the correction input for every certain period or every process is performed, the probability distribution data on the process variation amounts is generated on the basis of past instance data, and then recorded in the probability distribution database 3. When the probability distribution data is generated in step a01, a process correction rule is periodically generated on the basis of the past instance data, and then recorded in the rule database 6. When the rule data is generated in step a02, it is checked in step a03 whether or not a process correction request from a user or the system through the process-correction-condition input device 1 is made. When it is determined in step a03 that no process correction request from the user or the system through the process-correction-condition input device 1 is made (i.e., when there is no correction request), the procedure returns to step a01.

When it is determined in step a03 that the process correction request from the user or the system through the process-correction-condition input device 1 is made (i.e., when the correction request is inputted), it is inputted using the process-correction-condition input device 1 in step a04 which process (e.g., the process "A") is to be corrected and how the process is to be corrected (e.g., ten days' delay in the process plan) based on the process correction request. When the process correction condition is inputted to the system based on the process correction request in step a04, the influence of the correction contents of the corrected process (e.g., the process "A") on other processes is calculated in step a05 using information on the constraint condition data extracted from the constraint condition database 2 based on the inputted process correction condition (e.g., ten days' delay in the process plan), the probability distribution data extracted from the probability distribution database 3 based on the information on the processes (e.g., the processes "C" and "D") associated with the corrected process (e.g., the process "A") and the rule data extracted from the rule database 6.

When the influence of the correction contents of the corrected process on other processes is calculated in step a05 using information on the constraint condition data extracted on the basis of the inputted process correction condition, the probability distribution data extracted on the basis of the information on the processes associated with the corrected process and the rule data, the process plan corrected in step a05 is recorded in the process plan database 5 in step a06. When a request from the user or the system is made, the corrected process plan is displayed.

The embodiment of the project risk management system and the project risk management apparatus according to the present invention will be described below in further detail, using specific examples.

FIG. 4 shows a specific example of the instance data recorded in the instance database 9. Basically, items shown in FIG. 4 for respective detailed processes of a project are recorded as a database.

Referring to FIG. 4, specifically, the items to be recorded include a process name 901, a work type 902 of a work to be performed in the process, a type 903 of parts to be handled in the process, a unit number 904 of the parts to be handled in the process, a total weight 905 of the parts to be handled in the process, an occupational category 906 of workers who mainly perform the work to be executed in the process, a company name 907 of a company which mainly performs the work in the process, a planned number of man-hour 908 for the process, an actual number of man-hour 909 for the process, a planned construction period 910 of the process, an actual construction period 911 of the process, weather conditions 912 during a period in which the process is performed, a work area 913 of the process, information 914 indicating whether or not scaffolding is used in the work of the process, information 915 indicating whether or not a material-handling device is used in the work of the process, and a number 916 of workers supplied to the process.

FIG. 5 shows a flowchart for processing by the probability distribution data generator 7.

First, the information on past instances recorded in the instance database 9 is classified into groups in matrix [(TYPES OF WORKS)×(TYPES OF PARTS TO BE WORKED ON)] according to the types of works and the types of parts to be worked on. When the information on the past instances is classified into the groups according to the types of the works and the types of the parts to be worked on in step 701, one type of the works classified in step 701 is selected in step 702. When one type of the works is selected from the types of the works classified in step 702, one type of the parts to be worked on is selected in step 703 from the types of the parts classified in step 701.

When one type of the works is selected in step 702 from the types of the works classified in step 701 and one type of the parts to be worked on is selected in step 703 from the types of the parts classified in step 701, one process is selected in step 704 from processes which belong to a taxonomic group defined by the type of the work selected in step 702 and the type of the parts to be worked on selected in step 703. When one process is selected from the processes which belong to the taxonomic group in step 704, a deviation amount M of the number of man-hour per unit number of the parts for the process selected in step 704 is determined from Equation (1), in step 705.

$$M = ((\text{ACTUAL NUMBER OF MAN-HOUR}) - (\text{PLANNED NUMBER OF MAN-HOUR})) / (\text{NUMBER OF PARTS}) \quad (1)$$

When the deviation amount M of the number of man-hour per unit number of parts is determined in step 705, the deviation amount M of the number of man-hour per unit number of parts for the selected process is added to information on the value of the deviation amount M of the number of man-hour per unit number of parts for other processes in the selected group. On the basis of these deviation values, frequency distribution information (probability distribution data) on the deviation amount M of the number of man-hour is generated as the probability distribution data on the number of man-hour for the selected group. As segment information on the frequency distribution, data obtained by dividing a range from −50 to 50 days by the unit of 0.5 day is used. When the probability distribution data on the deviation amount M of the number of man-hour is generated in step 706, a deviation amount T of the construction period per unit number of parts for the process selected in step 704 is determined from Equation (2).

$$T = ((\text{ACTUAL CONSTRUCTION PERIOD}) - (\text{PLANNED CONSTRUCTION PERIOD})) / (\text{NUMBER OF PARTS}) \quad (2)$$

When the deviation amount T of the construction period per unit number of parts is determined in step 707, the deviation amount T of the construction period per unit number of parts for the selected process is added to information on the value of the deviations amount T of the construction period per unit number of parts for other processes in the selected group. On the basis of these values, frequency distribution information on the deviation amount T of the construction period (probability distribution data) on the construction period is generated as the probability distribution data on the construction period in the selected group. As segment information on the frequency distribution, data obtained by dividing a range from −50 to 50 days by the unit of 0.5 day is used.

When the probability distribution data on the deviation amount T of the construction period is generated in step 708, it is determined in step 709 whether or not the processing is performed on all the process information in the selected group. When it is determined in step 709 that the processing is not performed on all the process information in the selected group (or when the processing on all the process information is not completed), the procedure returns to step 704. On the other hand, when it is determined in step 709 that the processing is performed on all the process information in the selected group (or when the processing on all the process information is completed), it is determined in step 710 whether or not the processing is performed on all the types of the parts to be worked on in the selected type of the work. When it is determined in step 710 that the processing is not been performed on all the types of the parts to be worked on in the selected type of the work, the procedure returns to step 703. On the other hand, when it is determined in step 710 that the processing is performed on all the types of the parts to be worked on in the selected type of the work (or when the processing on all the types of the parts to be worked on in the selected type of the work is completed), it is determined in step 711 whether or not the processing on all the types of the works is performed. When it is determined in step 711 that the processing on all the types of the works is not performed, the procedure returns to step 702.

On the other hand, when it is determined in step 711 that the processing on all the types of the works is performed, the generated probability distribution data is outputted in step 712. Then, the generated probability distribution data is recorded in the probability distribution database 3 every element of the matrix, which comprises the types of works and the types of parts to be worked on in the works, for the number of man-hour and the construction period, thereby finishing this processing flow.

Figure 6:
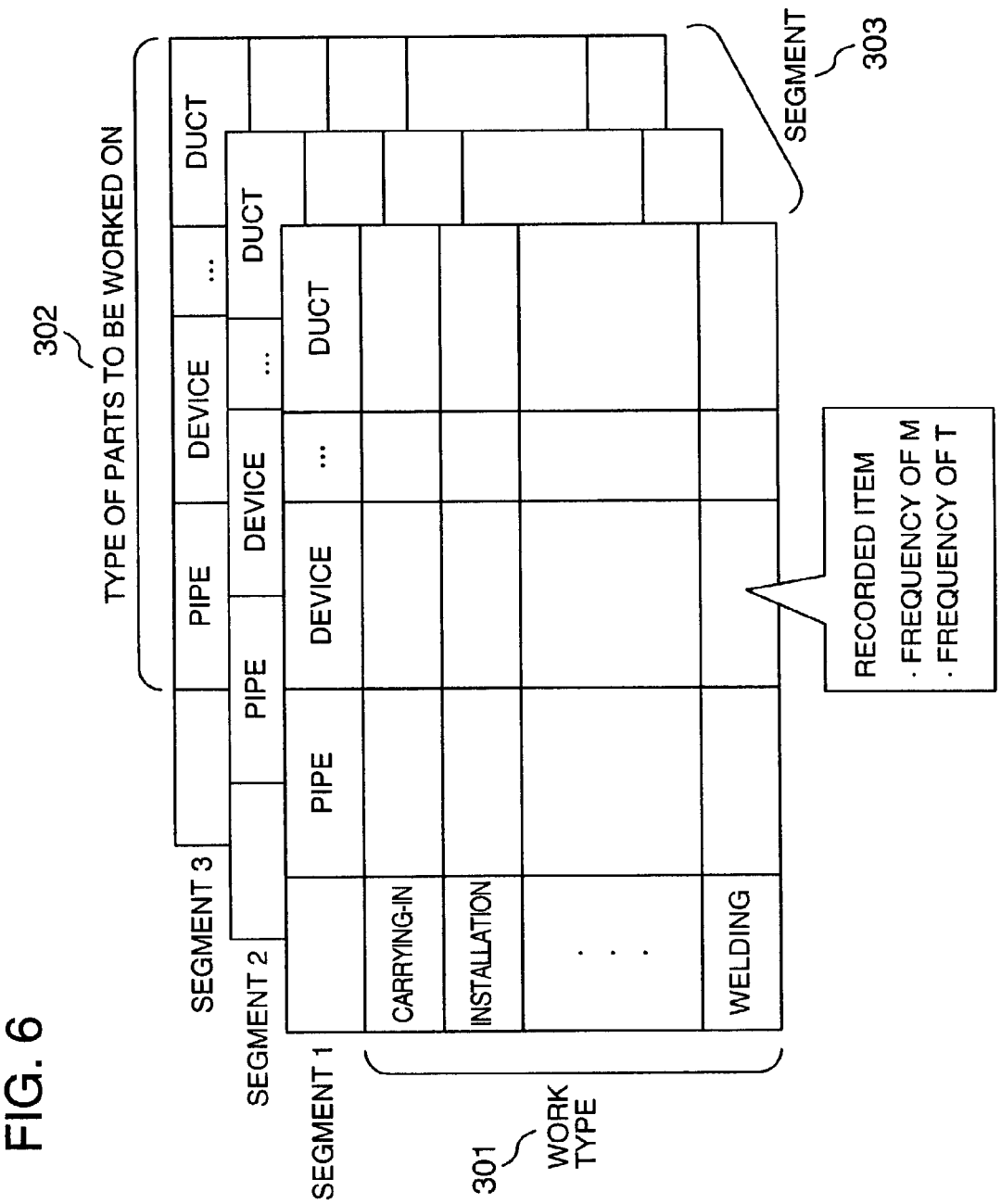
FIG. 6 is a drawing showing a data recording format for a probability distribution database illustrated in FIGS. 1 and 2.

FIG. 6 shows a data recording format for the probability distribution database 3 illustrated in FIGS. 1 and 2.

Referring to FIG. 6, the probability distribution database 3 takes on a three-dimensional database structure which comprises three axes including a work type 301, a type 302 of parts to be worked on in the work, a frequency distribution segment 303 obtained by dividing the range from −50 days to +50 days by the unit of 0.5 days. Then, the information on the frequency distribution of the number of man-hour (M) and the information on the frequency distribution of the construction periods (T) are recorded in the respective elements of the probability distribution database 3 illustrated in FIG. 6 as the frequency information for the respective elements (the information in the respective segments among the information on the frequency distribution of a group defined by the type of works and the type of parts to be worked on in the works).

FIG. 7 shows a flowchart for processing by the rule data generator 8 illustrated in FIG. 2.

First, in step 801, one process is selected from all the process information recorded in the instance database 9 illustrated in FIG. 2. When one process is selected from all the process information in step 801, the deviation amount M of the number of man-hour per number of parts for the process selected in step 801, which is defined by Equation (1), is calculated in step 802. When the deviation amount M of the number of man-hour per number of parts is calculated in step 802, the deviation amount T of the construction period per number of parts for the process selected in step 801, which is defined by Equation (2), is calculated in step 803. When the deviation amount T of the construction period per number of parts is calculated in step 803, the characteristic quantity of the process selected in step 801 is set in the form of a quantitative value. Specifically, information (such as a fine-day rate) recorded as the quantitative value is used without alteration, while information (such as presence or absence of scaffolding) recorded as a qualitative value is coded (example: (presence of scaffolding)=1, (absence of scaffolding)=0, and so forth), and then the coded values are used.

When the characteristic quantities (the quantitative values) are set in step 804, the deviation amount M of the number of man-hour per number of parts calculated in step 802 and the deviation amount T of the construction period per number of parts calculated in step 803 are associated (or paired) with the process characteristic quantity (the quantitative value) set in step 804, and recorded in the vector form (one-dimensional vector) in step 805. For example, in the forgoing example, they are recorded ass the one-dimensional vector (a code indicating the deviation amounts M and T, fine-day rate, and the presence or absence of scaffolding). When the deviation amount M of the number of man-hour per number of parts is paired with the deviation amount T of the construction period per number of parts, and then they are recorded in the vector form in step 805, it is determined in step 806 whether or not the processing from step 802 to step 805 is performed on all the processes recorded in the instance database 9. When it is determined in step 806 that the processing from step 802 to step 805 is not performed on all the processes recorded in the instance database 9, the procedure returns to step 801.

On the other hand, when it is determined in step 806 that the processing from step 802 to step 805 is performed on all the processes recorded in the instance database 9 (or all the processes are subjected to processing), one of the vectors recorded in step 805 is selected in step 807. When one vector is selected in step 807 from the vectors recorded, the vector selected in step 807 is normalized into a unit vector in step 808. After normalization of the vector selected in step 807 into the unit vector, angles made between the vector normalized in step 808 and all the other vectors (already normalized) are calculated (or the inner products of the unit vector with all the other vectors are calculated) in step 809.

After the angles made between the vector normalized in step 808 and all the other vectors (already normalized) are calculated (or the inner products of the unit vector with all the other vectors are calculated) in step 809, it is determined in step 810 whether or not the number of vectors with the values of the angles calculated in step 809 equal to or less than a given value (e.g., less than 10°) is equal to or more than a specified value (e.g., equal to or more than 5% of the number of all the vectors). When it is determined in step 810 that the number of vectors with the values of the angles calculated in step 809 equal to or less than the given value (e.g., less than 10°) is equal to or more than the specified value (e.g. equal to or more than 5% of the number of all the vectors), a rule is created based on a combination of vector elements in step 811. Specifically, if the average of the vectors in which the number of vectors of the same direction is equal to or more than the specified number) is (M=1.5 (man-hour), T=2 (days), fine-day rate=70%, and presence or absence of scaffolding=present), rule "If the fine-day rate is equal to or more than 70% and scaffolding is present, 1.5 man-hour should be incremented to the number of man-hour, and 2 days should be incremented to the construction period) is created, for example.

On the other hand, when it is determined in step 810 that the number of vectors with the values of the angles calculated in step 809 equal to or less than the given value (e.g., less than 10°) is not equal to or more than the specified value (e.g., equal to or more than 5% of the number of all the vectors), or when the rule is created in step 811 based on the combination of vector elements, it is determined in step 812 whether or not the processing is performed on all the vectors recorded in step 805. When it is determined in step 812 that the processing is not performed on all the vectors recorded in step 805, the procedure returns to step 807. On the other hand, when it is determined in step 812 that the processing is performed on all the vectors recorded in step 805 (or all the vectors are subjected to the processing), the rule created in step 811 is outputted to the rule database 6 in step 813, thereby completing this processing flow. If a plurality of rules with the deviation amounts of quantitative value parameters being within ±10% are present in this processing flow, a rule created using the average of the quantitative values for these rules is recorded as a typical rule.

FIG. 8 shows a data recording format for the rule database 6 illustrated in FIG. 2.

Referring to FIG. 8, data in the rule database 6 is classified into data in a condition division and data in a rule division, and is recorded for each rule. In the condition division of the rule database 6, parameters 601 used as criteria, application conditions 602 of these parameters, specific thresholds 603 for the application conditions, and relations 604 with other condition when a plurality of the conditions are present are recorded. Then, as a rule in the rule database 6 to be executed if the condition is satisfied, a parameter 605 which will be influenced by execution of the rule and an influence degree 606 are recorded. For example, rule data in the data recording format for the rule database 6 in FIG. 8 indicates that "if the fine-day rate is equal to or more than 70% and scaffolding is present, the construction period is incremented by 2 days".

Figure 9:
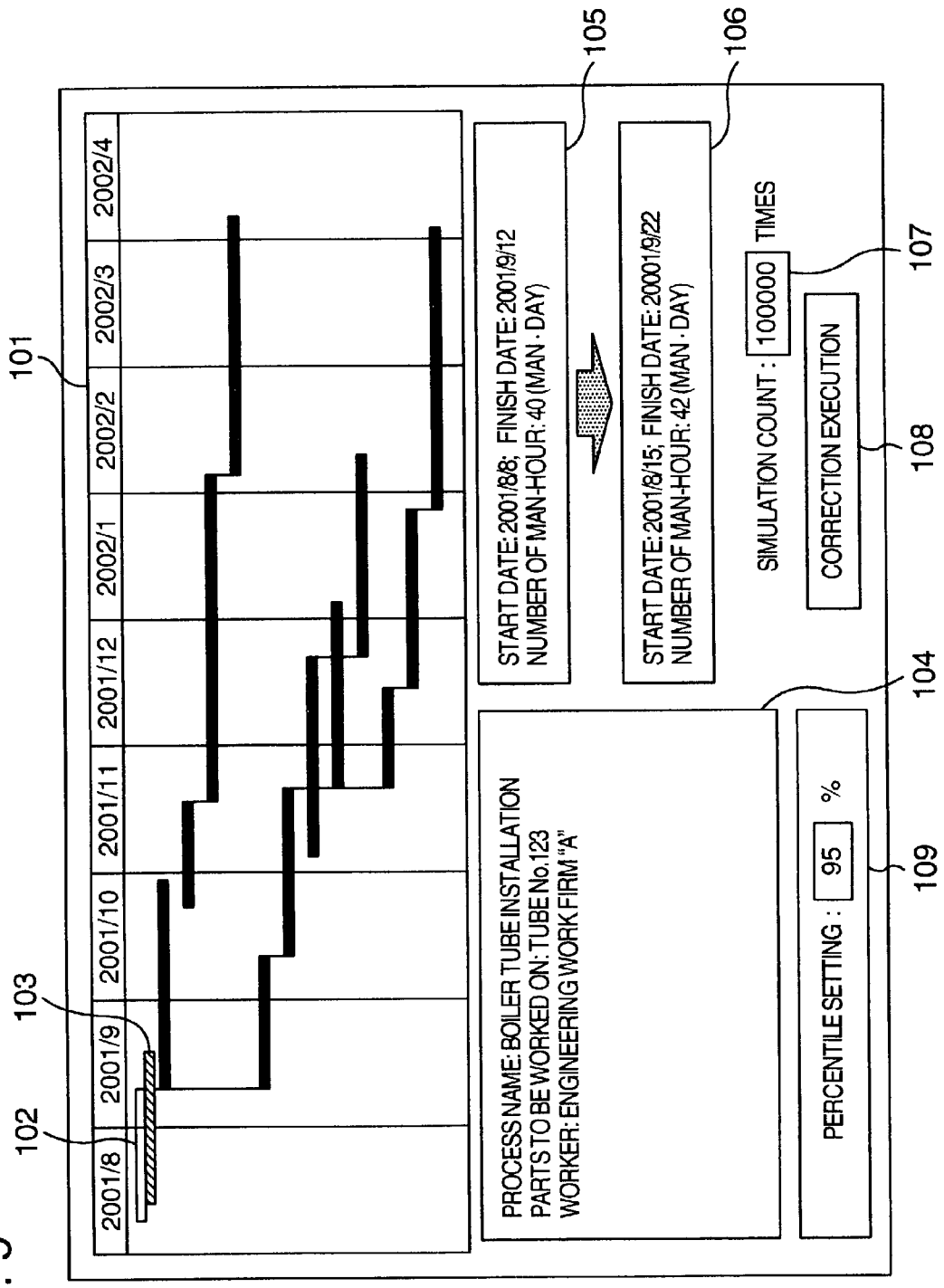
FIG. 9 is a drawing showing a display screen of a process-correction-condition input device illustrated in FIG. 2.

FIG. 9 shows a display screen of the process-correction-condition input device 1 illustrated in FIG. 2.

Referring to FIG. 9, it is inputted using the display screen of the process-correction-condition input device 1 which process is to be corrected and to what extent the process is to be corrected. On the display screen illustrated in FIG. 9, the processes recorded in the process plan database 5 are displayed as a process table 101, so that the user selects on the display screen of the process table 101 a process which he desires to correct, such as a process 102, by means of a mouse and so forth. At this point, attribute information 104 of the process 102 and information 105 indicating the execution period of the process 102 and the number of man-hour for the process 102 are displayed as information on the selected process 102. Then, the user sets how to correct the selected process 102, by setting the execution period of the process after correction as a process 103 on the process table, or by inputting from an input interface 106 information on the start and finish dates of the process and the number of man-hour for the process as numerical values. Incidentally, if the process correction degree is specified on the process table, the process 103 automatically causes the contents of correction to be reflected on the display contents of the input interface 106. If the specification is made using the input interface 106, the contents of correction is reflected as the process 103 on the display of the process table.

Further, the number of times of a Monte Carlo simulation which is performed when the deviation amount of the process is estimated is set using an entry box 107. The Monte Carlo simulation is a mathematical approach to determine the approximate solution of a problem by numerical experiments using repetitive calculations and random numbers, and simulates the variation amount of the process using random numbers for stochastic variations by means of a computer. Furthermore, a percentile value for evaluating the variation-amount prediction values calculated as the probability distribution is set using an entry box 109. The percentile value is a parameter used for presenting the variation amount which occurs with a probability equal to or below that percentile. Then, by selecting a "correction execution" button 108 after completion of all the settings, an estimation process of the variation amount is started under the set conditions.

FIG. 10 shows a data recording format for the constraint condition database 2 illustrated in FIGS. 1 and 2.

Referring to FIG. 10, as the constraint data in the rule database 6, a process code 201 (a process 406) for uniquely defining a process (or identifying a process), information on a time constraint (the constraint condition determined by a period required for completion of a process), and information on a sequence constraint (the constraint condition determined by the execution sequence relation with other processes) are recorded for each process. The time constraint illustrated in FIG. 10 which is data of the constraint condition for the rule database 6 defines the period over which the process can be performed, and is defined by a start time range 202 (e.g., from Aug. 1, 2001 to Sep. 31, 2001) and an finish time range 203 (e.g., from Sep. 20, 2001 to Dec. 21, 2001). When correcting a process, the process is corrected within the start time range and the finish time range set by the time constraint.

On the other hand, the sequence constraint illustrated in FIG. 10 which is data of the constraint condition for the rule database 6 defines processes subjected to the execution sequence with respect to the pertinent process, with a process code. In a preceding process code 204, processes (processes 101, 102 and 205) which is to be finished before the start of the pertinent process are defined. In a subsequent process code 205, processes (processes 412 and 501) which cannot be started unless the pertinent process is finished) are defined.

FIG. 11 shows a data recording format for the process plan database 5 illustrated in FIGS. 1 and 2.

Referring to FIG. 11, items shown in FIG. 11 for each detailed process are recorded in the process plan database 5 as a database. Specifically, the items to be recorded includes a process name 501 indicating the name of the process, a process code 502 for uniquely defining the process, a work type 503 indicating the type of a work to be performed in the process, a type of parts to be handled in the process 504, a unit number of the parts to be handled in the process 505, a total weight of the parts to be handled in the process 506, an occupational category of workers 507 who mainly perform the work to be executed in the process, a company name indicating the name of a company which mainly performs the work in the process 508, a planned number of man-hour 509 at the planning stage of the process, a planned construction period 510 in the planning stage of the process, a planned start date 511 of the process, a planned finish date 512 of the process, a work area 513 of the process, information 514 indicating whether or not the work of the process requires scaffolding, information 515 indicating whether or not the work of the process requires a material-handling device, a planned number 516 of workers to be supplied to the process, data 517 of frequency distribution on variation-range prediction values for the start date of the process, data 518 of frequency distribution data on variation-range prediction values for the finish date of the process, data 519 of frequency distribution data on variation-amount prediction values for the construction period, and data 520 of frequency distribution on variation-amount prediction values for the number of man-hour. For the data of the frequency distributions of the respective prediction values, the values are not recorded before processing by the process correction device 4 is not performed.

Figure 12:
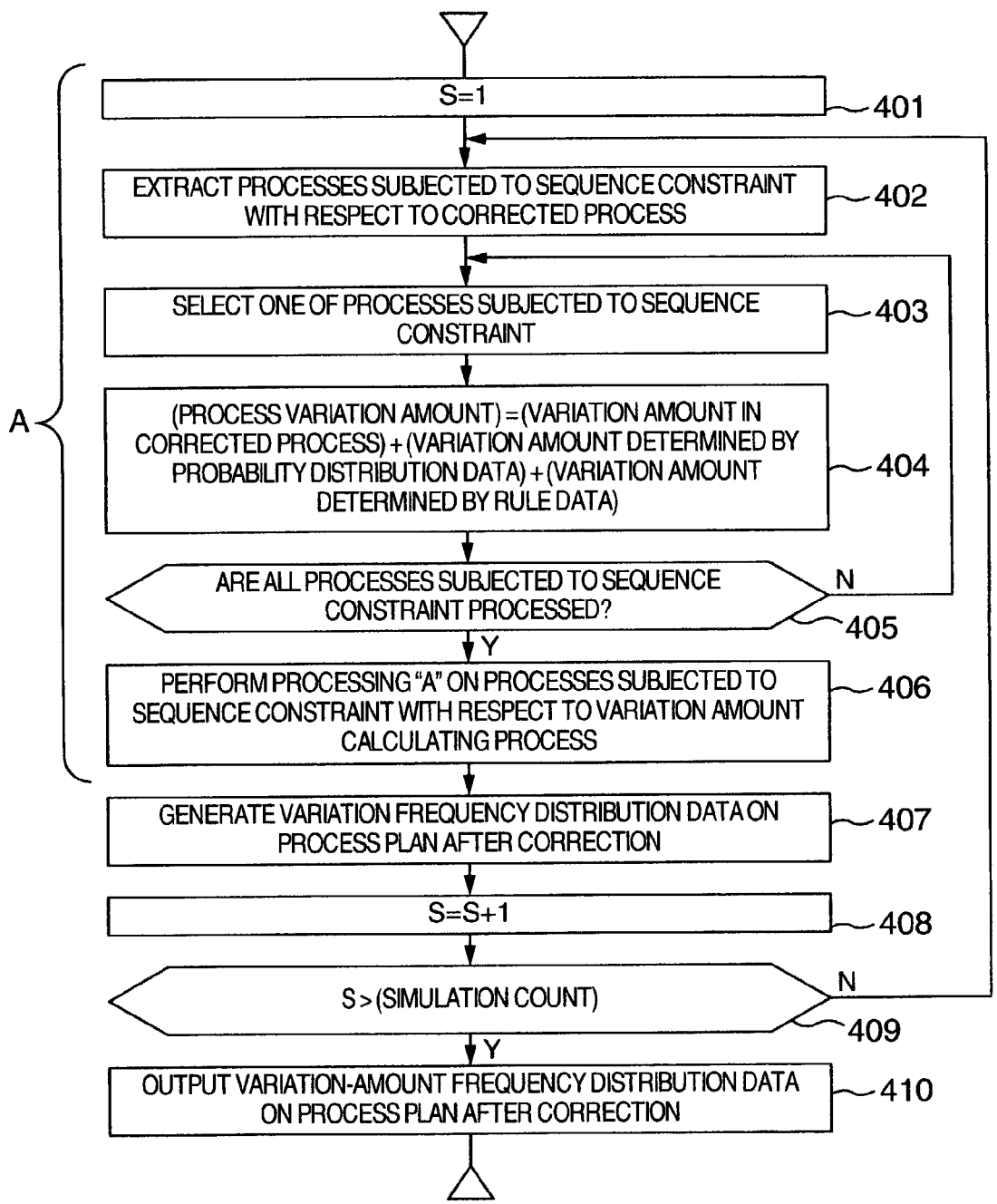
FIG. 12 is a drawing showing a flowchart for processing by a process correction device illustrated in FIGS. 1 and 2.

FIG. 12 shows a flowchart for processing by the process correction device 4 illustrated in FIGS. 1 and 2.

First, in step 401, a parameter S for a counter indicating a simulation count displayed on the display screen of the process-correction-condition input device 1 illustrated in FIG. 2 is set to "1". When the parameter S indicating the simulation count is set to "1" in step 401, processes are extracted which are subjected to the sequence constraint with respect to a process for which the input for correction is performed by the user or the system. When the processes subjected to the sequence constraint with respect to the corrected process are extracted in step 402, one of the processes extracted in step 402 is selected in step 403.

When one of the processes extracted in step 402 is selected in step 403, the variation-amount prediction value of the process selected in step 403 is calculated as the sum of a variation amount in the corrected process, a variation amount randomly selected on the basis of the probability distribution data, and a variation amount defined by rule data the condition of which is satisfied by the attribute data of the process selected in step 403.

(PROCESS VARIATION AMOUNT)=(VARIATION AMOUNT IN CORRECTED PROCESS)+ (VARIATION AMOUNT DETERMINED BY PROBABILITY DISTRIBUTION DATA)+ (VARIATION AMOUNT DETERMINED BY RULE DATA)

For calculation, the variation amount in the construction period is used as the variation amount without alteration. However, the variation amount in the number of man-hour is converted to the value expressed in terms of the variation amount in the construction period, based on the number of workers and using Equation (3).

(CONSTRUCTION PERIOD VARIATION AMOUNT)=(VARIATION AMOUNT IN NUMBER OF MAN-HOUR)/(NUMBER OF WORKERS)  (3)

Then, using information on the prediction value for the variation amount in the construction period, the prediction values for the variation ranges of the start and finish dates of the process are calculated.

When the variation amount prediction values for the process selected in step 403 are calculated in step 404, it is determined in step 405 whether or not the processing is performed on all the processes subjected to the sequence constraint, which are extracted in step 402. When it is determined in step 405 that the processing is not performed on all the processes subjected to the sequence constraint, which are extracted in step 402, the procedure returns to step 403. On the other hand, when it is determined in step 405 that the processing is performed on all the processes subjected to the sequence constraint, which are extracted in step 402, the processing from step 402 to step 406 is performed on the processes subjected to the sequence constraint with respect to all the processes extracted in step 402.

When the processing from step 402 to step 406 is performed on the processes subjected to the sequence constraints with respect to all the processes extracted in step 402, the variation amounts in the respective processes corrected by a series of processing are handled as frequency data in the current simulation count, so that the information on the variation-amount frequency distribution data for the respective processes is updated. When the variation amounts in the respective processes corrected by a series of processing are handled as the frequency data in the current simulation count and then the information on the variation-amount frequency distribution data for the respective processes is updated in step 407, the parameter S is incremented by "1" in step 408.

When the incrementing process is performed in step 408, it is determined in step 409 whether or not the parameter S exceeds the simulation count set by the process-correction-condition input device 1. When it is determined in step 409 that the parameter S does not exceed the simulation count set by the process-correction-condition input device 1, the procedure returns to step 403. On the other hand, when it is determined in step 409 that the parameter S exceeds the simulation count set by the process-correction-condition input device 1, the variation-amount frequency distribution data on the process plan after correction is outputted in step 410. Thereafter, the variation-amount frequency distribution data on the respective processes is recorded in the process plan database 5, and then this processing flow is finished.

Figure 13:
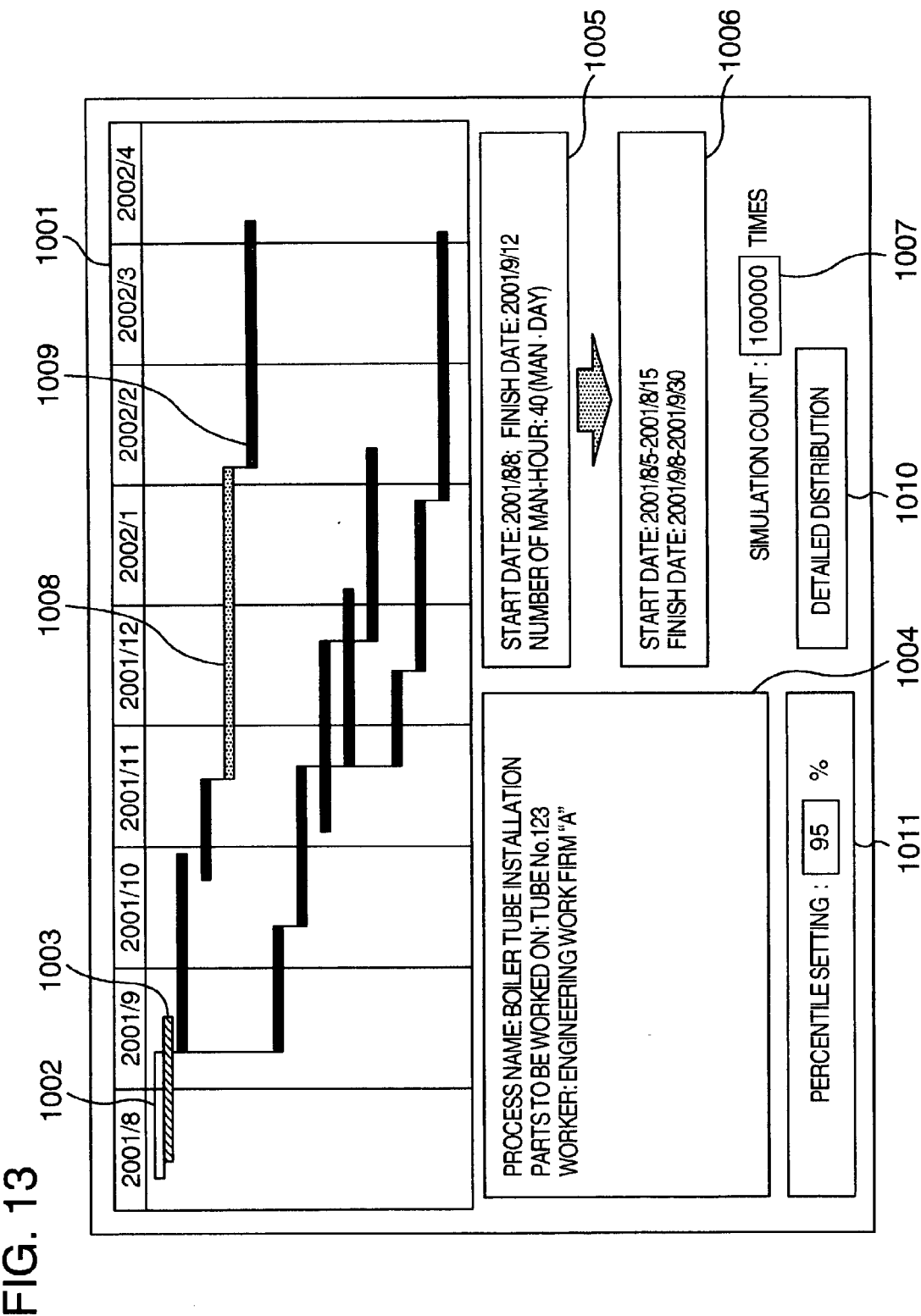
FIG. 13 is a drawing showing a display screen of process variation amounts in the process plan display device illustrated in FIG. 2.

FIG. 13 shows a display screen of the process plan display device 10 illustrated in FIG. 2, which indicates the process variation amounts.

Referring to FIG. 13, a process table 1001 is displayed on the display screen of the process plan display device 10 indicating the process variation amounts. This process table 1001 displays information on a correction target process 1002 set by means of the process-correction-condition input device 1 illustrated in FIG. 9, a process 1003 resulting from correction of the correction target process 1002, and ranges of variation amounts (variation ranges occurring with a probability set in terms of a percentile value) 1009 of respective processes. On the display screen of the process variation amounts in the process plan display device 10 illustrated in FIG. 13, a process 1008 in which the process selected by the user by means of a mouse and so forth is displayed in a different color, and attribute information 1004, construction period information 1005 and construction period variation amount information 1006 of the user-selected process 1008 are displayed. Further, by specifying (or clicking) a "detailed distribution" button 1010 on the display screen of the process plan display device 10 illustrated in FIG. 13, indicating the process variation amounts, a shift to a display for displaying information on the variation-amount frequency distribution of the user-selected process 1008 takes place. The display screen of the process plan display device 10 illustrated in FIG. 13, indicating the process variation amounts also displays information 1007 on the simulation count and percentile information 1011 set by the process-correction-condition input device 1.

Figure 14:
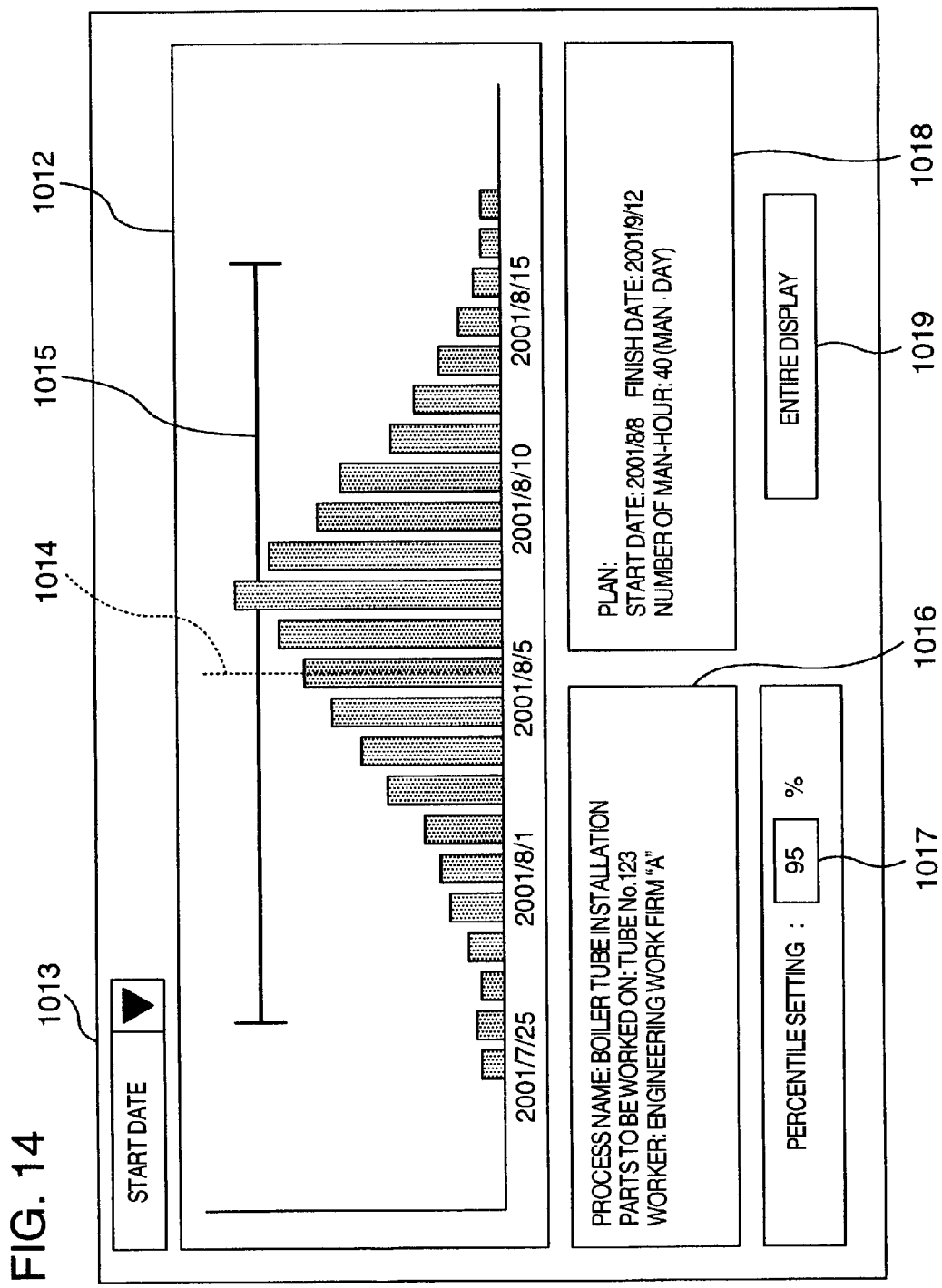
FIG. 14 is a drawing showing a display screen of a frequency distribution in the process plan display device illustrated in FIG. 2.

FIG. 14 shows a display screen of the process plan display device 10 illustrated in FIG. 2, indicating the frequency distribution.

Referring to FIG. 14, first, a selection switch 1013 is used to select which information of the frequency distribution to be displayed for a selected process. At the time of display, four items "start date", "finish date", "construction period" and "number of man-hour" become the display targets. Then, a frequency distribution graph 1012 concerning the item set by the selection switch 1013 is displayed. To take the frequency distribution of the start dates as an example (refer to the selection switch 1013), the horizontal axis of the frequency distribution graph represents the date, while the vertical axis of the graph represents the frequency. Further, the planned date at the planning time of the start date of the selected process is indicated by a dotted line 1014, and the variation range 1015 of the start date based on the set percentile is also displayed. The attribute information 1016, construction period information 1018 and percentile information 1017 of the selected process are also displayed.

Further, by pressing (or clicking) an "entire display" button 1019, the probability distribution of the construction period variation amount of not each process but the overall project can also be displayed. Incidentally, the method of displaying the probability distribution for this purpose is the same as the method of displaying the probability distribution for each process.

In this embodiment, basically, the variation amount in the construction period is predicted. However, by employing a model (in a linear form and so forth) which defines the relationship between the variation amount in the construction period and the resulting increased cost, it also becomes possible to evaluate the influence of the process correction on future cost variations. The display screen showing the cost variation amount in that case is shown in FIG. 15.

Figure 15:
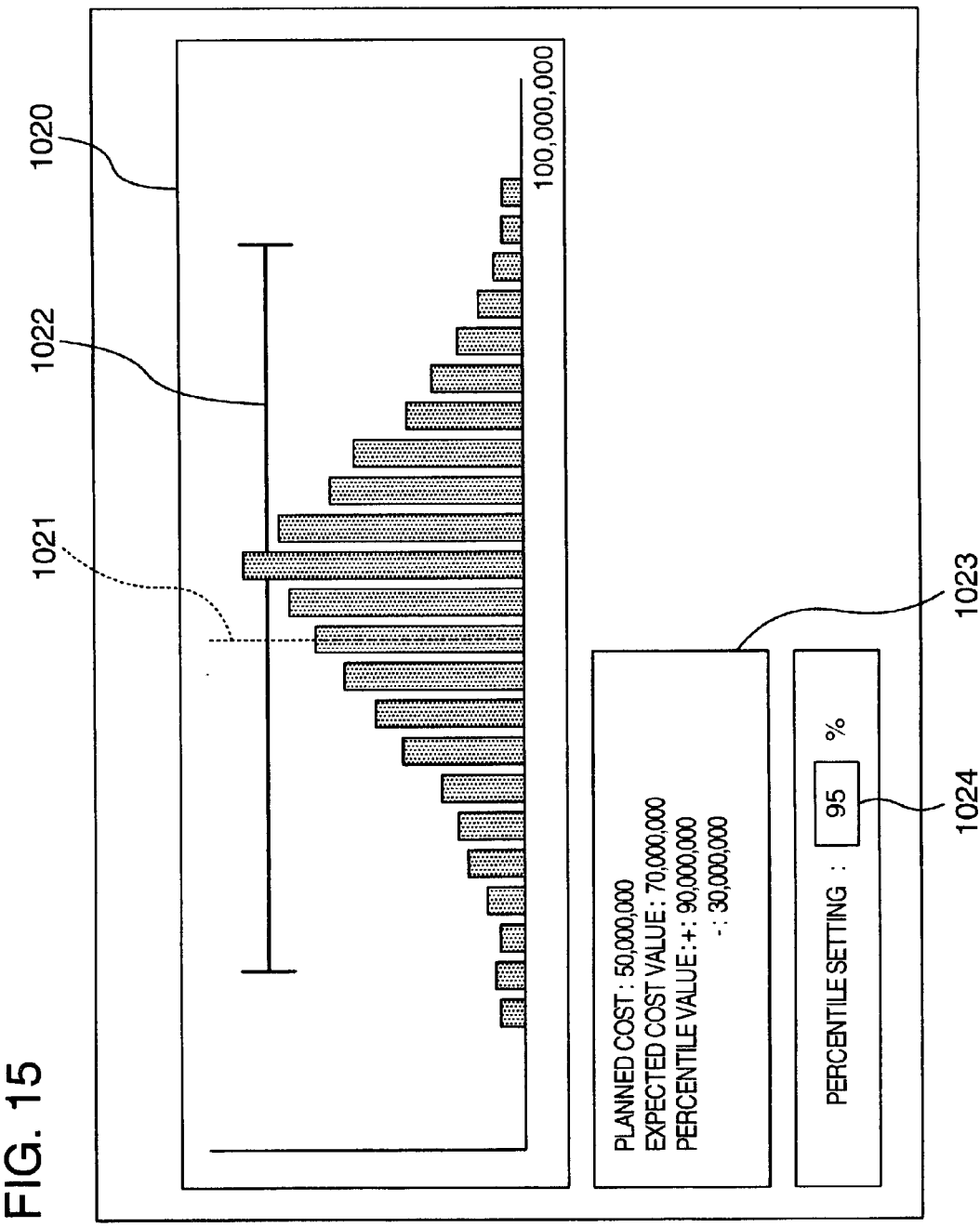
FIG. 15 is a drawing showing a display screen of a frequency distribution of cost variation amounts.

Referring to FIG. 15, a cost frequency distribution graph 1020 is displayed on the display screen. The horizontal axis of the graph represents the cost amount, while the vertical axis of the graph represents the frequency. On the display screen illustrated in FIG. 15, a planned cost at the planning time is indicated by a dotted line 1021, and a cost variation range 1022 based on the set percentile value is also displayed. On a display section 1023 of the display screen illustrated in FIG. 15, the planned cost, an expected cost value and a cost percentile are displayed as specific amounts of money. On the display section 1023 of the display screen illustrated in FIG. 15, a percentile value 1024 is also displayed.

In this embodiment, the description is directed to the instance of the project management in the construction work. However, the present invention is not limited to the project management in the construction work, and can also be extensively applied to the process management in other fields such as software development, operation schedules of transportation means and a semiconductor manufacturing process. Thus, the approach which is the same as the one according to the embodiment can be adopted.

Figure 16:
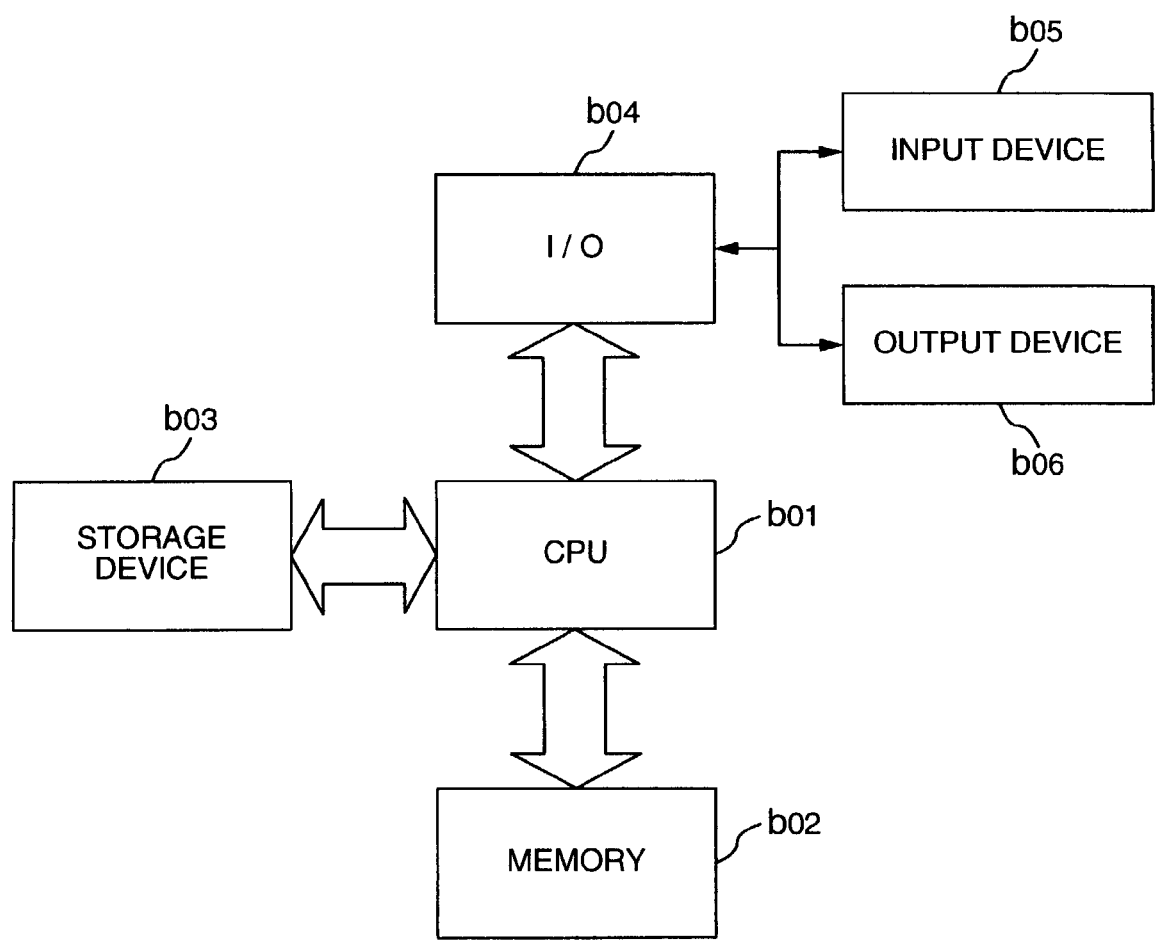
FIG. 16 is a drawing showing an example of a hardware configuration of the project risk management system and the project risk management apparatus according to the present invention.

The foregoing description is given about an example of the processing according to the present invention. When the processing is actually systematized, as shown in FIG. 16, in hardware which includes a CPU b01, a memory b02, a storage device b03, an input device b04 and an output device b05, programs and databases according to the present invention recorded in the storage device b03 are transferred to the memory b02, and the processing is performed by the CPU b01 on the basis of command information supplied from the input device b04. Then, the result of the processing is displayed on the output device b05.

According to the present invention, the influence amount to other processes when a process is corrected can be estimated not as the propagation of the variation fixed values, but so as to be more suited to the actual circumstances according to the attribute information of the process or the past variation patterns of the process.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A project risk management system comprising:
   a process plan database that records work-process information defined by work information, including at least one information piece including work type, type of parts to be worked on, number of parts to be worked on, total weight of parts to be worked on, occupational category of workers, name of engineering work company, planned number of man-hours, planned construction period, weather during work, work area, presence/absence of scaffolding, use/nonuse of material handling device, and number of workers;
   a constraint condition database that records definition information, including at least one information piece including time definition of possible start time of work process, possible finish time of the work process, and sequence of work processes;
   a probability distribution database that records, as probability distribution, at least one information piece including a variation-amount for the start time of work process, a variation-amount for the finish time of work process, and a variation-amount for the construction period; and
   a process-correction-condition input device that corrects arbitrarily at least one information piece of the work information of a work process,
   wherein when an arbitrary correction to an information piece of the work information is made by the process-correction-condition input device, the project risk management system:
   calculates, as probability distribution, at least one of a variation-amount for the start time, a variation-amount for the finish time, and a variation-amount for the construction period of a work process which will occur due to the correction, by using the information recorded in the probability distribution database, and
   calculates, based on the information recorded in the constraint condition database, at least one of a variation-amount for the start time, a variation-amount for the finish time, and a variation-amount for the construction period of a work process which is affected by the work process in which variation occurred, as summation of probability distribution of an affecting work process and probability distribution of an affected work process,
   wherein at least one of a variation-amount for the start time, a variation-amount for the finish time, and a variation-amount for the construction period of an overall process plan is calculated by using probability distribution.

2. The project risk management system according to claim 1, wherein when the calculated process plan is displayed, a range of the variation-amount in each of the work processes which may occur with a probability set by a user or the system is displayed together with each of the work processes.

3. The project risk management system according to claim 1, further comprising a rule database that defines variation-amounts for at least one of the start time, the finish time, and the construction period of work processes corresponding to correction patterns of work information pieces,
   wherein when the arbitrary correction corresponds in contents to a correction pattern, the calculated variation-amount is added with a variation-amount corresponding to the correction pattern obtained from the rule database.

4. The project risk management system according to claim 1, further comprising an instance database that records, as instance data, planned values assumed before starting of work processes and actual values clarified after finishing of the work processes for at least one of the start time, the finish time, and the construction period of the work processes,
   wherein, from difference information between an actual value of the construction period or number of man-hour for each of work processes and a planned value thereof recorded in the instance database, the project management system creates frequency distribution, and records, as probability distribution data, the frequency distribution information of the difference information thus created in the probability distribution database.

5. The project risk management system according to claim 3, further comprising an instance database that records, as instance data, information as to planned number of man-hour, actual number of man-hour, planned construction period, and actual construction period as numerical-value information of work processes, and at least one of work type, type of parts to be worked on, number of parts to be worked on, total weight of parts to be worked on, occupational category of workers, name of engineering company, weather during work, work area, presence/absence of scaffolding, use/nonuse of material-handling device, and number of workers as characteristic information, wherein the project risk management system:

creates vector information on a work process basis using the numerical-value information for each of work processes and the characteristic information, and the difference information between an actual value of the construction period or number of man-hour for each of work processes and a planned value thereof recorded in the instance database as parameters, among the vector information created by the information on a work process basis recorded in the instance database, extracts vectors whose direction is a same within a given range and whose number is equal to or greater than a given value, defines, as a correction pattern, a combination of the characteristic information of a work process associated with the extracted vectors and a difference-amount between an actual value of the construction period or number of man-hour, and stores the correction pattern in the rule database.

6. The project risk management system according to claim 4, wherein generation and recording of the probability distribution database are performed for each type of works in each of the work processes and for each type of parts to be worked on in each of the work processes.

* * * * *

UNITED STATES PATENT AND TRADEMARK OFFICE
CERTIFICATE OF CORRECTION

PATENT NO. : 7,318,039 B2  
APPLICATION NO. : 10/246690  
DATED : January 8, 2008  
INVENTOR(S) : Yokota et al.

It is certified that error appears in the above-identified patent and that said Letters Patent is hereby corrected as shown below:

Title Pg, Item (73) Assignee:  
Please add as a co-assignee

-- [73] Hitachi, Ltd., Tokyo (JP) --.

Signed and Sealed this

Twenty-first Day of October, 2008

JON W. DUDAS  
*Director of the United States Patent and Trademark Office*